United States Patent
Bosma et al.

(10) Patent No.: US 11,261,284 B2
(45) Date of Patent: Mar. 1, 2022

(54) PROCESS FOR THE PREPARATION OF A THIXOTROPIC COMPOSITION

(71) Applicant: ALLNEX Netherlands B.V., Bergen Op Zoom (NL)

(72) Inventors: Martin Bosma, Arnhem (NL); Petrus Johannes Maria David Elfrink, Boxmeer (NL); Enrico Richardus August Rensen, Arnhem (NL); Richard Hendrikus Gerrit Brinkhuis, Zwolle (NL)

(73) Assignee: ALLNEX NETHERLANDS B.V., Bergen Op Zoom (NL)

( * ) Notice: Subject to any disclaimer, the term of this patent is extended or adjusted under 35 U.S.C. 154(b) by 299 days.

(21) Appl. No.: 16/339,749

(22) PCT Filed: Nov. 7, 2017

(86) PCT No.: PCT/EP2017/078430
§ 371 (c)(1),
(2) Date: Apr. 5, 2019

(87) PCT Pub. No.: WO2018/083328
PCT Pub. Date: May 11, 2018

(65) Prior Publication Data
US 2020/0048398 A1 Feb. 13, 2020

(30) Foreign Application Priority Data

Nov. 7, 2016 (EP) ..................................... 16197582
Jan. 23, 2017 (EP) ..................................... 17152633

(51) Int. Cl.
| | |
|---|---|
| *C08G 18/28* | (2006.01) |
| *C08G 18/73* | (2006.01) |
| *C08J 3/22* | (2006.01) |
| *C08L 75/02* | (2006.01) |
| *C09D 5/04* | (2006.01) |
| *C09D 175/02* | (2006.01) |
| *C09K 3/10* | (2006.01) |
| *C08J 3/28* | (2006.01) |

(52) U.S. Cl.
CPC ......... *C08G 18/2865* (2013.01); *C08G 18/73* (2013.01); *C08J 3/22* (2013.01); *C08J 3/226* (2013.01); *C08J 3/28* (2013.01); *C08L 75/02* (2013.01); *C09D 5/04* (2013.01); *C09D 175/02* (2013.01); *C09K 3/10* (2013.01); *C08J 2375/02* (2013.01); *C09K 2003/1071* (2013.01)

(58) Field of Classification Search
CPC ........ C08G 18/2865; C08G 18/73; C08J 3/22; C08J 2375/02; C08J 3/28; C08J 3/226; C08L 75/02; C09D 5/04; C09D 175/02; C09K 3/10; C09K 2003/1071
See application file for complete search history.

(56) References Cited

U.S. PATENT DOCUMENTS

| | | | |
|---|---|---|---|
| 4,677,028 | A | 6/1987 | Heeringa et al. |
| 8,697,758 | B2 | 4/2014 | Yamanaka |
| 2010/0137453 | A1 | 6/2010 | Brinkhuis |
| 2016/0017158 | A1 | 1/2016 | Uhlianuk et al. |
| 2017/0090248 | A1* | 3/2017 | Yoneyama ....... B29D 11/00788 |

FOREIGN PATENT DOCUMENTS

| | | |
|---|---|---|
| CN | 103525218 | 1/2014 |
| EP | 0 192 304 | 8/1986 |
| EP | 0 198 519 | 10/1986 |
| EP | 1 641 887 | 4/2006 |
| EP | 1 641 888 | 4/2006 |
| EP | 1 902 081 | 3/2008 |
| EP | 2 332 906 | 6/2011 |
| JP | 2010-77037 | 4/2010 |
| TW | 200408648 | 6/2004 |
| WO | 03/097228 | 11/2003 |
| WO | 2005/005557 | 1/2005 |
| WO | 2005/005558 | 1/2005 |
| WO | 2007/000335 | 1/2007 |

OTHER PUBLICATIONS

International Search Report dated Mar. 1, 2018 in International Application No. PCT/EP2017/078430.
Written Opinion of the International Searching Authority dated Mar. 1, 2018 in International Application No. PCT/EP2017/078430.

* cited by examiner

*Primary Examiner* — Rabon A Sergent
(74) *Attorney, Agent, or Firm* — Wenderoth, Lind & Ponack, L.L.P.

(57) ABSTRACT

The invention relates to a process for the preparation of a thixotropic composition comprising polyurea particles, said process comprising contacting and reacting in a liquid medium reactants to form a polyurea and precipitating the polyurea to form polyurea particles, wherein acoustic vibration is applied during contacting of the reactants or as a post-treatment on the formed polyurea particles or both. The invention further relates to a thixotropic composition obtainable by the process, in particular thixotropic composition comprising high amounts of polyurea particles and optionally a polymer resin having high thixotropic efficiency. The compositions can be used, in particular as a masterbatch, in preparation of i.a. coating compositions.

43 Claims, 4 Drawing Sheets

PROCESS FOR THE PREPARATION OF A THIXOTROPIC COMPOSITION

BACKGROUND OF THE INVENTION

Field of the Invention

The invention relates to a process for the preparation of a thixotropic composition comprising polyurea particles, to thixotropic composition comprising polyurea particles and to the uses thereof.

Description of the Related Art

Thixotropic compositions are widely used to provide favorable flow properties to paint compositions. Although the invention primarily relates to paint compositions, the thixotropic compositions can also be used in general in liquid compositions, preferably comprising a resin, such as adhesives, inks, gel coats, sealants, composites etc.

Thixotropic compositions are herein also referred to as sag control agent (SCA). Polyurea SCA's are widely used in various modifications in paint compositions to prevent formation of sagging defects (sagging tears or curtain formation) in the wet uncured paint while preserving the good leveling properties of the paint. The polyurea thixotropic compositions comprise polyurea particles that are the reaction product of a polyisocyanate and a monoamine or the reaction product of a polyamine and a mono-isocyanate. Typical polyurea SCA's are solid particles having a thin and long needle like shape. Addition of such SCA particles to a paint composition can result in pseudoplastic, thixotropic rheological behavior. Pseudoplasticity of a composition means that the viscosity of that composition under low shear conditions is higher than the viscosity under high shear conditions. Pseudoplastic behavior increases the sag resistance of the composition when applied in non-horizontal applications. Thixotropic behavior is governed by the observation that a finite time is needed to obtain the low shear equilibrium viscosity after the sample was subjected to a high shear treatment. That means that after reducing the viscosity while applying the paint at high shear, the viscosity builds up in the wet coating layer at low shear quick enough to prevent dripping of the wet paint. Proper thixotropic behavior of the composition ensures an outstanding combination of good sag resistance and preservation of good levelling properties.

The polyurea particles in the thixotropic compositions may negatively influence coating appearance. It is a challenge to achieve the desired thixotropic rheological properties of the paint with minimum disadvantageous effects of the particles on the optical and mechanical properties of the finally cured coating and evidently also to minimize cost. This calls for thixotropic composition with a high thixotropic efficiency (hereafter also referred to as TE) meaning that the thixotropic composition, when used in a coating composition, results in a high thixotropic effect at a low amount of SCA. The precise definition and measurement method of the thixotropic efficiency is described below.

EP0198519 describes a thixotropic composition prepared by preparing a polyurea SCA in a carrier resin which can be used as a SCA master batch to provide thixotropic properties. Paint formulators typically use a SCA masterbatch as it is practically impossible for a paint formulator to do the SCA particle formation in the envisaged paint composition, which may comprise a different resin, and achieve high quality and consistent thixotropic behavior. However, the addition of this SCA master batch has the disadvantage that it introduces a carrier resin in the envisaged paint composition. This carrier resin may not be the desired optimal resin for the envisaged properties of the paint. It is practically impossible, due to the huge diversity of different coating resins, to prepare master batches of SCA in the resin that is to be used as the binder in the final coating composition. Further, as the thixotropic efficiency of the SCA master batch is lower when prepared at high concentration of the SCA, a relatively low concentration of the SCA on total carrier resin must be used thus introducing a relatively high amount of carrier resin in the paint recipe. This reduces the formulation freedom of the paint maker and may introduce problems of compatibility, quality control etc.

EP0192304 describes a SCA based on isocyanurate for use in a paint composition which is satisfactorily thixotropic also at low curing temperature. EP1641887 and EP1641888 describe a SCA based on optically active mono- or polyamine or mono- or polyisocyanate. EP1902081 describes a SCA comprising a first polyurea reaction product of a first polyisocyanate with a first, preferably chiral, amine and a second polyurea reaction product of a second polyisocyanate with a second amine, preferably a non-chiral amine, different from the first polyurea reaction product and precipitated in the presence of the first reaction product. However, despite some improvements in thixotropic efficiency, these polyurea SCA compositions have a low SCA concentration or a low thixotropic efficiency and are prepared in the presence of a carrier resin when a higher SCA concentration is needed for use as master batch.

US2016017158A1 describes a method to prepare a polyurea SCA composition having a relatively high concentration in an organic non-polymeric solvent without a carrier resin being present by reacting an amine with polyisocyanate in an emulsifier or disperser device, for example a rotor/stator machine or a high shear Cowles impeller. The method allegedly results in a polyurea SCA composition which has the advantage of providing a product that is storage stable for a period of at least 60 days. The examples in this document show that the thixotropic compositions, when used in a polyol resin in an amount of 2.2 wt % SCA crystals on total weight of the composition, have a very low thixotropic efficiency which can be readily seen from the fact that the low-shear viscosity is hardly higher than high-shear viscosity despite the high concentration of polyurea SCA particles.

U.S. Pat. No. 4,677,028 describes a method for preparation of a polyurea SCA composition by reacting, in absence of a carrier resin, an amine with polyisocyanate in an organic solvent to form the SCA under vigorous stirring, followed by adding the obtained reaction product to a resin with organic solvent followed by grinding to reduce the fineness to a fineness of less than 15 μm. The disadvantage of the methods precipitating SCA without resin being present is that this typically results in polyurea particles having a low thixotropic efficiency and being very coarse. Too high coarseness of the particles is unacceptable in coating applications as it will result in poor coating appearance. Reduction of the coarseness by an additional intensive grinding step is a distinct disadvantage and will typically result in a reduction of the polyurea SCA thixotropic efficiency.

Therefore, there still exists a desire and a problem to provide a polyurea SCA composition and a process for the preparation of such a composition not having one or more of the abovementioned problems, in particular a thixotropic composition comprising a high concentration of polyurea SCA particles having a high thixotropic efficiency even when prepared in substantial absence of a carrier resin and preferably being substantially free of coarse SCA particles.

BRIEF DESCRIPTION OF THE FIGURES

The features and advantages of the invention will be appreciated upon reference to the following drawings, in which.

BRIEF DESCRIPTION OF ILLUSTRATIVE EMBODIMENTS

According to one aspect of the invention one or more of the mentioned problems have been solved by providing a process for the preparation of a thixotropic composition comprising polyurea particles, said process comprising contacting and reacting in a liquid medium reactants (I) comprising a polyisocyanate (a) and a mono-amine (b) or reactants (II) comprising a polyamine (a) and a mono-isocyanate (b) to form a polyurea and precipitating the polyurea to form polyurea particles, wherein acoustic vibration is applied during contacting of the reactants or, as a post-treatment, on the formed polyurea particles or both.

The inventors have found that with processes of the invention thixotropic compositions can be prepared with a high content of polyurea particles and with a high thixotropic efficiency even when using simple reactants that otherwise would result in SCA with poor thixotropic efficiency and without the need for the presence of resin components during reaction and precipitation and without need for further treatment steps like grinding. Compared to normal preparation processes, in the process of the invention the Hegman fineness can be improved without substantial deterioration of the thixotropic efficiency or even with improvement of the thixotropic efficiency.

A thixotropic composition obtained by the process of the invention has a good thixotropic efficiency and Hegman fineness. Preferably, the thixotropic composition has a good thixotropic efficiency with reduced compliance between 20% and 50%, more preferably a high thixotropic efficiency with a reduced compliance between 10% and 20% and most preferably a very high thixotropic efficiency with a reduced compliance less than 10% and a Hegman fineness value of preferably less than 40, more preferably less than 20, and even more preferably less than 15 µm.

The precise definition and measurement method of the thixotropic efficiency (expressed as a low reduced compliance) and the Hegman fineness are described below. Unless specified differently, the weight percentages herein refer to the weight relative to the total weight of the composition not including any pigments or fillers and the solids weight percentage refers to the weight percentage of the non volatile paint components not including any pigments or fillers.

Therefore, in another aspect the invention relates to a thixotropic composition obtainable by any of the processes according to the invention.

The high thixotropic efficiency can be obtained in the process of the invention even in substantial absence of a polymeric resin. In view of the use as a masterbatch in a process for the preparation of paint compositions it is preferred that the thixotropic composition of the invention comprises substantially no polymeric resin. Here and hereafter "Substantially no polymeric resin" or "substantial absence of polymeric resin" means less than 1, preferably less than 0.5, more preferably less than 0.1 and most preferably 0 wt % of polymeric resin relative to total solids weight of the composition.

In one embodiment (A), the invention relates to a thixotropic composition comprising a high amount of polyurea particles, preferably comprising at least 5 wt %, preferably at least 8 wt %, more preferably at least 10 wt % of polyurea particles and comprising substantially no polymeric resin (wherein wt % is relative to the total weight of the thixotropic composition).

In another embodiment (B), the invention relates to a thixotropic composition comprising a low amount of polymeric resin, preferably comprising at least 5 wt %, preferably at least 8 wt %, more preferably at least 10 wt % of polyurea particles and comprising between 1 and 40 wt %, preferably between 1 and 25 wt %, more preferably between 1 and 15 wt % and most preferably between 1 and 10 wt % of polymeric resin, for example for improving compatibility of the thixotropic composition with the paint to which it is to be added and/or for improving the thixotropic efficiency. These compositions A and B are very suitable for use as a master batch due to the relatively low or zero amount of polymer resin. When used as a masterbatch in the preparation of a paint which comprises a binder resin different from the polymeric resin in the thixotropic composition, the polymeric resin is preferably present in such low amount that it does not substantially affect the coating properties.

The novel thixotropic compositions A and B have, despite of the high polyurea particle content, a high thixotropic efficiency and/or Hegman fineness characterised in that the thixotropic composition, when tested in a standard formulation as described in the description below at a concentration of 1.5 wt % polyurea particles on total solids weight, has a reduced compliance lower than 50%, preferable lower than 40%, more preferable lower than 30%, even more preferably lower than 20% and most preferably lower than 15% and ideally even lower than 10% and a Hegman fineness value of less than 40, preferably less than 20 and more preferably less than 15 μm.

In yet another embodiment C, the invention relates to a thixotropic composition, which is an in-situ prepared thixotropic composition, wherein the polyurea particles are precipitated in a composition comprising a high polymeric resin content and subjected to acoustic vibrations in accordance with the process of the invention. The thixotropic composition preferably comprises 0.1 to 8 wt %, preferably 0.1 to 5 wt % of polyurea particles and between 40 and 85% of a polymeric resin. This thixotropic composition can also be used as a master batch but can also be used as a paint or be formulated into a paint by addition of further paint additives without further binder resin addition.

Due to the process of the invention polyurea can be used that otherwise would not attain the low reduced compliance below 50% or Hegman fineness below 40 micrometer as specified above in a normal preparation method.

In yet another embodiment of the process of the invention, acoustic vibration is applied only as a posttreatment to a thixotropic composition comprising polyurea particles, in particular to a thixotropic composition comprising polyurea particles having a low thixotropic efficiency and/or particle fineness, in order to improve the thixotropic efficiency and/or fineness.

The invention also relates to the use of the thixotropic compositions of the invention as described, preferably as a master batch, in a process for the preparation of a coating-, paint-, adhesive-, ink- or sealant compositions. The invention also relates to a coating, ink, adhesive or sealant compositions prepared from the thixotropic compositions of the invention or comprising the polyurea particles from the thixotropic compositions of the invention and to cured coatings having improved appearance.

DETAILED DESCRIPTION OF THE INVENTION

In the process according to the invention the thixotropic composition comprising polyurea particles is prepared by contacting and reacting the reactants in a liquid medium. In one embodiment the reactants (I) comprise a polyisocyanate (a) and a mono-amine (b). In another embodiment the reactants (II) comprise a polyamine (a) and a mono-isocyanate (b). The polyurea particles are substantially insoluble in the liquid medium and on reaction, the polyurea that is formed precipitates to form the polyurea particles, which typically have a needle shape which renders thixotropic properties.

Preferably, in view of the polyurea precipitation, in the process the temperature during the contacting of the reactants and/or in the post-treatment of the formed polyurea particles is lower than 80° C., more preferably lower than 60° C. even more preferably lower than 50° C.

The acoustic vibration is applied during contacting or after completion of the contacting of the reactants as post treatment of the formed polyurea particles or more preferably both. Contacting the reactants is for example done by adding one reactant to the other reactant in the liquid medium, typically by dosing over a certain period of time. In one embodiment, acoustic vibration is applied only after completion of the contacting of the reactants (referred to as posttreatment). "After completion of the contacting" typically means "after completion of the dosing". In another embodiment, acoustic vibration is applied only during contacting of the reactants, typically during the dosing and in a more preferred embodiment both during contacting of the reactants and after completion of the contacting of the reactants. In a preferred embodiment of the process the reactants and reaction product are additionally subjected to stirring during at least a part of the duration of the acoustic vibration, preferably during the contacting of the reactants, to keep the formed polyurea particle dispersion flowable as long as possible.

As used herein, the term "acoustic vibration" refers to sonic vibration, more preferably, ultrasonic vibration and is applied either indirectly or, more preferably, directly. Sonic and ultrasonic vibration is characterized by frequencies below and above 20 kHz respectively. Direct acoustic vibration means that the acoustic vibration transducer is immersed into the liquid medium. Indirect acoustic vibration means that the vibration is transmitted through a liquid to a container comprising the liquid medium, for example an ultrasonic bath as in FIG. 2.

In view of achieving sufficient thixotropic efficiency, the energy density E1 of the acoustic vibration is preferably higher than 5 W/l, more preferably higher than 10, 20, 50 W/l, but most preferably higher than 100 W/l. The unit of the energy density 'W/l' refers to the gross power of the applied (ultra)sound (in Watt, W) divided by the total volume of the liquid exposed to the (ultra)sound (in liter, l). More preferably, the acoustic vibration has an energy density E2 of more than 5 W/l, more preferably more than 10, 20, 50 or more preferably more than 100 W/l, where the energy density is the gross power of the ultrasonic unit(s) divided by the total volume of thixotropic composition being exposed to the ultrasound.

A liquid medium is present during the contacting and reacting of the reactants as a dispersing medium and to transfer the sonic vibration. The liquid medium is a solvent for the reactants but not a solvent for the polyurea particles. Preferably, a liquid medium is chosen from a solvent, a reactive diluent, a low molecular weight resin, preferably a UV curable resin or an epoxy resin or combinations thereof, and optionally comprising a polymer resin dissolved or dispersed therein. The liquid medium can be water, an organic solvent, a reactive diluent, a monomer or combinations thereof. In principle the type of liquid medium can be broadly chosen in view of the envisaged use of the thixotropic composition. Preferred organic solvents are typical diluting solvent as used in the paint industry, including but not limited to xylene, Solvesso 100, Solvesso 150 or other aromatic solvents, butylacetate, butanol, white spirit or combinations thereof. In view of the use of the thixotropic composition as a masterbatch in the preparation of paint compositions, the liquid medium is preferably chosen to be a solvent that is also used in or compatible with the solvent used in the envisaged solvent borne paint composition.

In a preferred embodiment the liquid medium only comprises a non-reactive solvent as the liquid medium. However, in an alternative embodiment, for example for use in reactive coating applications, the liquid medium can comprise reactive components, for example monomers or oligomers, for example ethylenically unsaturated monomers, a UV curable resin or an epoxy resin. Herein, the monomer, oligomer or resin have low molecular weight having a GPC low molecular weight Mn up to 1500, more preferably up to 1000 gr/mole and even more preferably up to 800 gr/mole. This is distinguished from a polymeric resin having Mn higher than 1500 gr/mole, preferably higher than 2000 or even 3000 gr/mole. In embodiments of the thixotropic composition comprising a polymeric resin, the polymeric resin is part of the liquid medium, preferably as solution or dispersion.

In a preferred embodiment of the process the reaction takes place in a liquid medium in substantial absence of polymeric resin material and the formed thixotropic composition comprises at least 4 wt %, more preferably at least 6 wt %, 8 wt %, 10 wt % or even at least 15 wt % of polyurea particles and substantially no polymeric resin material. An upper limit is typically up to 40 wt %, 30 wt % or 20 wt % of polyurea particles relative to the total weight of the thixotropic composition. The resulting composition has a very high thixotropic efficiency despite the high polyurea content and despite absence of resin and can be used as master batch composition for the manufacture of a thixotropic paint composition without having to introduce an unintended resin.

In another embodiment of the process, the thixotropic composition comprises polymeric resin material in an amount between 1 and 40 wt %, preferably between 1 and 25 wt %, more preferably between 1 and 15 wt % and most preferably between 1 and 10 wt %, and preferably at least 4 wt %, more preferably at least 8 wt %, even more preferably at least 10 wt %, most preferably at least 13 wt % of polyurea particles relative to the total weight of the thixotropic composition including the polymeric resin material. The polymeric resin material can be present during the reaction or is added after the reaction depending on the intended use. The polymeric resin can compatibilise the thixotropic composition with the coating composition in which it is used as a master batch, for example to improve the miscibility. Preferably, in this embodiment the reaction and precipitation of the urea takes place in the presence of the polymeric resin material as this typically increases the thixotropic efficiency.

A further improvement in thixotropic efficiency and/or Hegman fineness, compared to existing thixotropic compositions, can be obtained in the process of the invention wherein the reaction takes place in the presence of a high amount, typically between 40 and 85% of a polymeric resin material as a binder. This is an amount range typical for coating compositions. In this embodiment of the process, the composition typically comprises between 0.1 and 8 wt %, preferably between 0.1 and 5 wt %, more preferably 0.2 and 5 wt % of polyurea particles relative to the total weight of the composition. In this process, the polyurea SCA has a very high thixotropic efficiency. The composition can be used as master batch in a paint formulation, but can also be directly in-situ prepared in the envisaged end formulation of a paint by mixing the polyurea reactants into the paint composition together with other components of the paint composition under application of sonic vibration. For the use as a masterbatch of this thixotropic composition embodiment, the polyurea particle content is preferably at least 2 wt %, more preferably at least 3 wt %.

In an alternative embodiment of the process, acoustic vibration is applied only as a posttreatment to a thixotropic composition or to a coating composition comprising polyurea particles and optionally a polymeric resin material. The process can thus be used to increase the thixotropic efficiency of a composition that has a too low thixotropic efficiency for the envisaged application and/or to improve the Hegman fineness of the polyurea SCA composition. The polyurea SCA composition can for example be a commercially existing product. Typically such thixotropic compositions are compositions comprising at least 1 wt %, preferably at least 3 wt %, more preferably at least 5 wt %, even more preferably at least 8 wt %, or most preferably at least 10 wt % or even at least 13 wt % of polyurea particles relative to the total weight of the thixotropic composition.

Suitable polyurea SCA's that can be used in the process and product of the invention are known and described in the prior art as described above. Preferably, in the thixotropic composition at least part of the polyurea particles is prepared from a di-isocyanate and benzylamine or wherein at least part of the polyurea particles is prepared from chiral amines or chiral isocyanates.

A particularly attractive aspect of the invention is that relatively inexpensive type of polyurea SCA can be used that would normally have insufficient thixotropic efficiency. A relatively high thixotropic efficiency can be achieved also at high polyurea contents with a relative inexpensive polyurea. For example, a thixotropic composition based polyurea wherein at least part of the polyurea particles is prepared from a di-isocyanate and benzylamine prepared at concentrations above 5 wt % can have unacceptable low thixotropic efficiency (i.e. a reduced compliance well above 50%), but the thixotropic composition according to the invention based on the same polyurea can attain a high thixotropic efficiency composition (reduced compliance between 20% and 50%, more preferably a reduced compliance between 10% and 20% or most preferably a reduced compliance less than 10% when tested in the standard reference formulation described below) at concentrations above 5 wt % or even at least 10 wt % at sufficiently long ultrasonic treatment times as exemplified in the examples. Preferably, herein the ultrasonic posttreatment time is at least 5, 15 or even at least 30 minutes. The skilled man is able on the basis of this description to establish the time and sonic vibration conditions needed to arrive at the required minimum thixotropic efficiency. The invention relates to thixotropic composition comprising at least 5 wt % polyurea particles prepared from a di-isocyanate and benzylamine and having, when tested in a standard formulation as described in the description below at a concentration of 1.5 wt % polyurea particles on total solids weight, a reduced compliance lower than 50%, preferable lower than 40%, more preferable lower than 30%, even more preferably lower than 20% and most preferably lower than 15% and ideally even lower than 10% and a Hegman fineness value of less than 40, preferably less than 20 and more preferably less than 15 µm. It is surprising that this polyurea can have a higher thixotropic efficiency than the much more expensive prior art SAMBA/HDMI polyurea as demonstrated in the examples.

However, in view of obtaining as high as possible thixotropic efficiency it is preferred that at least part of the polyurea particles is prepared using at least partly chiral amines or chiral isocyanates, preferably chiral mono-amines or chiral mono-isocyanates and wherein the resulting composition has a high thixotropic efficiency, in particular having when tested in the standard formulation as described herein a reduced compliance less than 20%, preferable lower than 15% and most preferably lower than 10% and a Hegman fineness value of less than 40, preferably less than 20 and more preferably less than 15 µm.

Preferably, reactants (I) are used comprising a polyisocyanate (a) and a mono-amine (b). Preferably the polyisocyanate (a) is one or more component chosen from the group of symmetrical aliphatic or homocyclic diisocyanate and mono-amine (b) is one or more component chosen from the group of compounds containing at least a primary amino group and optionally an ether group.

In principle, suitable amines are, for example, aliphatic (substituted) alkylamine such as cycloheyxlamine, butylamine, hexylamine, laurylamine, or 3-methoxypropylamine or aliphatic (alkylaryl) amines such as 2-phenylethylamine, benzylamine and 3-aminomethyl-pyridyl amine. Preferably in view of achieving high thixotropic efficiency, an optically active mono-amine is used, not as racemic mixture, resulting in a polyurea molecule having a chiral carbon atom adjacent to an amine or isocyanate group.

The polyisocyanates are preferably selected from the group consisting of aliphatic, cycloaliphatic, aralkylene, and arylene polyisocyanates, more preferably from the group consisting of substituted or unsubstituted linear aliphatic polyisocyanates (and their isocyanurates, biurets, uretdiones) and substituted or unsubstituted arylene, aralkylene, and cyclohexylene polyisocyanates. The polyisocyanate usually contains 2 to 40 and preferably 4 to 12 carbon atoms between the NCO groups. The polyisocyanate preferably contains at most four isocyanate groups, more preferably at most three isocyanate groups, and most preferably two isocyanate groups. It is even more preferred to use a symmetrical aliphatic or cyclohexylene diisocyanate. Suitable examples of diisocyanates are described in EP1902081 (incorporated by reference in its entirety).

In view of environmental interests it is preferred to use in the composition an as high as possible percentage of constituents originating from renewable resources. Therefore, the polyisocyanate in the SCA of the invention preferably is biobased, for example Desmodur ECON7300. Amines from renewable biobased resources are well known in the art (eg amino acids).

SCA's that are most preferred in view of achieving high thixotropic efficiency in the process of the invention are described in EP1902081 describing a thixotropic agent SCA comprising a first polyurea reaction product of a first polyisocyanate with a first amine and a second polyurea reaction product of a second polyisocyanate with a second amine different from the first polyurea reaction product precipitated in the presence of the colloidal particles of the first reaction product. Preferably herein the first polyurea comprises chiral reactants and the second polyurea only comprises non-chiral reactants. Most preferably the first polyurea is a reaction product of hexamethylene diisocyanate (HMDI) with alpha-methylbenzylamine (AMBA) and a second polyurea reaction product of hexamethylene diisocyanate (HMDI) with benzylamine (BA) precipitated in the presence of anisotropic colloidal particles of the said first reaction product.

In another embodiment, the reactants (I) may further comprise a polyamine, preferably a di- or triamine, in an amount preferably providing less than 80 mole %, preferably less than 70, 50, 30, 10 or even less than 5 mole % of the total amount of amine groups or wherein the reactants II further comprise a polyisocyanate, preferably a di- or tri-isocyanate in an amount preferably providing less than 80 mole %, preferably less than 70, 50, 30, 10 or even less than 5 mole % of the total isocyanate groups.

Good results were obtained in a process according to the invention in which the reactants and reaction product are subjected to ultrasound vibration for a time period of at least 30 seconds, more preferably at least 2 minutes, even more preferably for at least 5 minutes and most preferably at least 10 or even 20 minutes. The acoustic vibration time can decrease with increasing energy density applied and the times mentioned typically apply to energy densities E1 of 10-30 W/l. In a preferred embodiment of the process the acoustic vibration is a posttreatment after the substantial completion of the contacting of the reactants for a time period of at least 1 minutes, even more preferably for at least 5 minutes and most preferably at least 20 min. This acoustic vibration post-treatment process according to the invention can be applied immediately after the contacting of the reactants and formation of the polyurea particles, but can also be applied to a thixotropic composition obtained from a completely separate process and/or from another location and/or produced a significant time before application of the posttreatment, for example to upgrade a commercially available product which has poor thixotropic efficiency and/or poor fineness. This can be a thixotropic paint composition or a thixotropic composition having a high SCA content for use as a masterbatch.

The degree of sagging of a paint during the flash-off (FO) drying period depends on the rate and degree of viscosity increase following the application process (next to other effects like the applied layer thickness). For Newtonian paints, the rate of viscosity increase only depends on solvent evaporation. For thixotropic paints, such as those modified with SCA, the degree of FO sagging also depends on the thixotropic effect. A strong thixotropic effect means that the paint shows a significantly improved sag resistance compared to a similar paint without the thixotropic effect.

Figure 1:
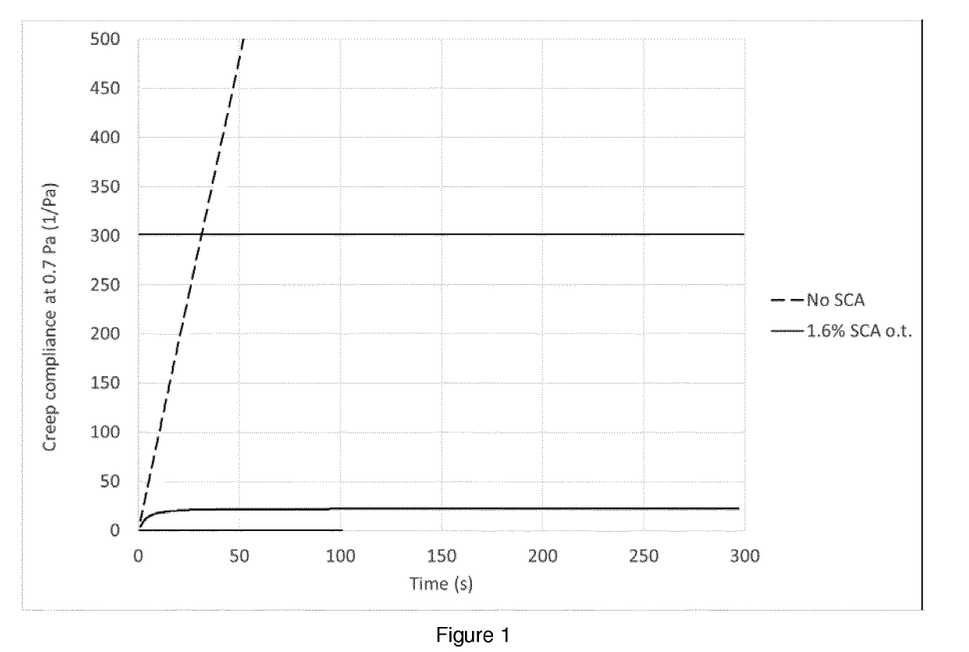
FIG. 1 is a graph showing creep compliance measurement at a creep stress of 0.7 Pa of a paint composition (solids content of 53 wt %) with and without the thixotropic composition of the invention.

As described in detail in M. Bosma et al, Progress in Organic Coatings, 55, 97-104 (2006), the degree of sagging of thixotropic paints during the flash-off drying period and therefore also the effect of an SCA can be described by determining the creep compliance J of the paint in conditions comparable to the actual paint conditions: at room temperature (23° C.) after 300 seconds (5 min) at a shear stress comparable to that acting on the wet paint applied on a vertical panel (ca 0.7 Pa for a 70 µm thick wet paint layer). This creep compliance is hereafter referred to as J(0.7 Pa, 300 sec) or J(0.7 Pa, 300 sec, 23° C.) or J5'. To simulate the application of the paint, the sample is given, prior to the compliance creep test, a high-shear treatment (30 s at 1000 $s^{-1}$) after which the cone is stopped (2 s at zero $s^{-1}$) to first remove and then allow to build up of the structure of the SCA network in the composition. The creep compliance J5' was determined using a rotational, air bearing rheometer with a cone and plate geometry (40 mm diameter with cone angle 4°) and is the resulting strain divided by the applied stress (1/Pa). A low creep compliance J5' hence means a low sagging and a good sag resistance. FIG. 1 shows a plot of the creep compliance as a function of time for a composition with and without SCA.

A more correct value of the creep compliance is the reduced creep compliance $J_{red}$. This is more correct because thixotropy in fact means high viscosity at low shear and low viscosity at high shear conditions. The high-shear viscosity (HS-viscosity) is defined here as the viscosity determined at a shear rate of 950±100 $s^{-1}$. This high shear rate was chosen low enough to avoid significant viscous heating during the measurement. The reduced compliance of a given composition can be calculated from the measured compliance J (0.7 Pa, 300 s) and the high-shear viscosity:

$$J_{reduced} = \frac{HS-\text{viscosity} \cdot J(0.7\text{ Pa, }300\text{ s})}{300} \quad \text{[Equation 1]}$$

The amount of sagging and accordingly the creep compliance J5' depends on the nature and the solids content of the resin and on the amount of the SCA in the composition. So in order to be able to compare the thixotropic efficiency of one SCA with another SCA objectively and quantitatively, and to determine the effect of the acoustic treatment, the reduce compliance must be determined in a standard formulation with defined solids content and concentration of SCA.

The standard formulation used here has a fixed SCA concentration of 1.5 wt % on total solids and a solids content of 60.9 wt %. Herein, the reference resin composition is Setal 1715 VX-74, a saturated polyester in solvent naphtha/xylene available from Allnex with a solids content of 74.3 wt %. The reduced compliance of a thixotropic composition is measured by first making a standard formulation taking an amount of the thixotropic composition and adding to the composition the standard resin Setal 1715 VX-74 in such amount that the amount of polyurea particles is 1.5 wt % on total solids and adjusting the amount of o-xylene to a total solids content of 60.9 wt %. This composition is then used for testing the reduced compliance and Hegman fineness.

In case a thixotropic composition comprises a polyurea SCA and also a polymer resin that is a different type of polymer resin than the polymer resin Setal 1715 VX-74 used to prepare the standard formulation, the amount of that different polymer resin in the standard formulation should be at most 25%, preferably at most 10 wt % of the total amount of polymer resin in the standard formulation to be tested. In case a thixotropic composition comprises a polyurea SCA and a liquid medium different from o-xylene, the amount of that different liquid medium in the standard formulation should be at most 25%, preferably at most 10 wt % of the total amount of liquid medium in the standard formulation to be tested. In case a higher amount of different liquid medium would be present this different liquid medium is preferably replaced with o-xylene.

A commercial HMDI-benzylamine SCA type prepared in the presence of a polyol resin namely Setalux 91715 SS-55 (ex. Allnex. Total solids content=53 wt %, % SCA on solids is 6.2 wt %) is used as a reference thixotropic composition as it is known to have a very high thixotropic efficiency. The composition of the standard formulation based on Setal 1715 and Setalux 91715 is shown in Table 1 below. It has a high-shear viscosity of 0.45 Pa·s and a creep compliance J5' of 111.3 1/Pa and thus a reduced compliance of 17%. The thixotropic quality of other SCA's can be determined by measuring the reduced compliance in a similar standard formulation (1.5 wt % SCA on total solids, a solids content of 60.9 wt %, the resin being predominantly Setal 1715 VX-74 and using o-xylene as diluting solvent). A reduced compliance lower than 20% denotes SCA's with very high thixotropic efficiency, a reduced compliance between 50% and 20% denotes SCA's with a good thixotropic efficiency and reduced compliance values well above 50% in the reference formulation denote SCA's with poor thixotropic efficiency.

TABLE 1

| Setalux 91715 SS-55 | 62.1 gram |
| Setal 1715 VX-74 Resin | 27.8 gram |

TABLE 1-continued

| o-Xylene | 10.1 gram |
| % NVM | 60.9 wt % |
| % SCA on solids weight | 1.5 wt % |

The thixotropic composition obtainable by the process of the invention is preferably characterized in that it has, when tested in a standard formulation at a concentration of 1.5 wt % polyurea particles on total solids weight, a reduced compliance lower than 50%, preferable lower than 40%, more preferable lower than 30%, even more preferably lower than 20% and most preferably lower than 15% and ideally even lower than 10%. The reduced compliance is defined and tested as described above in a standard formulation and calculated from the mathematical product of the measured compliance J (0.7 Pa, 300 s) and the high-shear viscosity, determined at a shear rate of 950±100 s$^{-1}$, divided by 300 according to Equation 1.

In case there is no sample to measure the creep compliance in a standard formulation, the compliance value measured after 300 s at 0.7 Pa in slightly deviating formulations can also be used to calculate the reduced compliance using the correction described by equation 2:

$$J_{reduced} = \frac{1 + k \cdot [\% \text{ SCA } o.s.]^p}{5.99} \cdot \frac{HS-\text{viscosity} \cdot J(0.7\text{ Pa, }300\text{ s})}{300} \quad \text{[Equation 2]}$$

wherein $J_{reduced}$ is the corrected reduced compliance, HS-viscosity and J (0.7 Pa, 300 s) are the high-shear viscosity and compliance value measured for the deviating formulation, respectively, % SCA o.s. is the actual weight % of SCA particles on total solids weight in the deviating formulation and k=2.57·10$^7$, and p=3.68.

Next to a high thixotropic efficiency, it is also preferred that the SCA particles are not significantly visible in the cured coating. The particle size of the SCA in a paint formulation is determined using the Hegman method which is described in more detail below. In commercial paint applications, the SCA particle size as determined with the Hegman method is preferably below the applied layer thickness by at least 10%, more preferably by at least 15, 25 or even 35%.

The thixotropic composition is preferably further characterized in that it has, when tested in a standard resin composition as described above at a polyurea particles concentration of 1.5 wt % on total solids weight, a Hegman fineness value of less than 40, preferably less than 20, and more preferably less than 15 μm.

The Hegman method is generally evaluated by trained human operators who make visual observations of the surface appearance of an SCA composition "drawdown" sample. The drawdown evaluation typically uses a device known as a "Hegman Fineness Gauge", usually referred to as a "Hegman Gauge", as described in American Society for Testing and Materials (ASTM) Standard D1210 "Standard Test Method for Fineness of Dispersion of Pigment-Vehicle Systems by Hegman-Type Gage". The Hegman gauge comprises a hardened steel (or stainless steel or chrome-plated steel) block (called a Hegman Gauge Block) and a hardened scraper of similar material. The hardened steel block has a flat ground planar surface and has a tapered path machined along its 127 millimeter length. The tapered path is e.g. 50 micrometers deep at one end and the path tapers to a depth of zero at its other end. The Hegman gauge for manual drawdowns has a one-half inch wide path. Calibration scales are marked along the lateral edges of the path. Along one edge the scale is marked in micrometers (designating the depth of the tapered path). A predetermined quantity of paint is deposited at the deep end of the tapered path of the Hegman gauge block. The hardened steel scraper is placed on the steel block and drawn along its length, leaving behind, in the tapered path, a film-like deposit of paint whose thickness tapers from a maximum thickness to a minimum thickness. The operator visually observes the sample and looks for large particles that protrude from the paint film surface. These protrusions are known as "particles", "specks" or "scats". The operator visually determines the location along the gauge where the specks first appear. Because the appearance of the drawdown sample changes as the paste or paint sample begins to dry, a visual observation must be made immediately. Within about ten seconds of the drawdown the operator makes a visual observation of the appearance of the drawdown sample. The operator determines the point along the gauge where a definite pattern of multiple specks appear (dust particles or very few particles are not taken into account). This point is called the "fineness line" or "fineness measurement" and provides an indication of the fineness or quality of the SCA.

The invention relates to the use of the thixotropic composition of the invention in a process for the preparation of a coating-, adhesive-, ink- or sealant compositions, in particular to the use of the thixotropic composition A or B as a masterbatch in a process for the preparation of a coating-, gel coat-, paint-, adhesive-, ink- or sealant composition.

Other envisaged uses are in detergents, paper, paperboard, textiles, construction materials, engineering plastics, pigments, mining fluids, or cosmetics. The invention further relates in particular to a coating-, adhesive-, ink- or sealant composition prepared from a thixotropic composition according to the invention or comprising polyurea particles from a thixotropic composition of the invention. The invention further relates to cured coatings prepared from the coating composition of the invention having a good appearance at lower SCA content.

EXAMPLES

Abbreviations Used

BA is Benzylamine, HMDI is Hexamethylene diisocyanate and o-Xylene is ortho-Xylene, NVM is non-volatile material (determined according to ISO 3251), SCA is Sag Control Agent, SAMBA is (S)-(−)-α-Methylbenzylamine, HSV is high shear viscosity, HF is Hegman fineness and US is ultrasonic.

Samples of thixotropic compositions (hereafter also referred to as Sag Control Dispersion) were made with compositions as shown in Table 2 (10 wt % of HDMI/BA in o-xylene).

TABLE 2

|  | Gram | mol | o-Xylene (gram) |
|---|---|---|---|
| BA | 29.67 | 0.28 | 250 |
| HMDI | 23.26 | 0.14 | 190 |
| o-Xylene rinse | — | — | 35 |

Example 1

Figure 2:
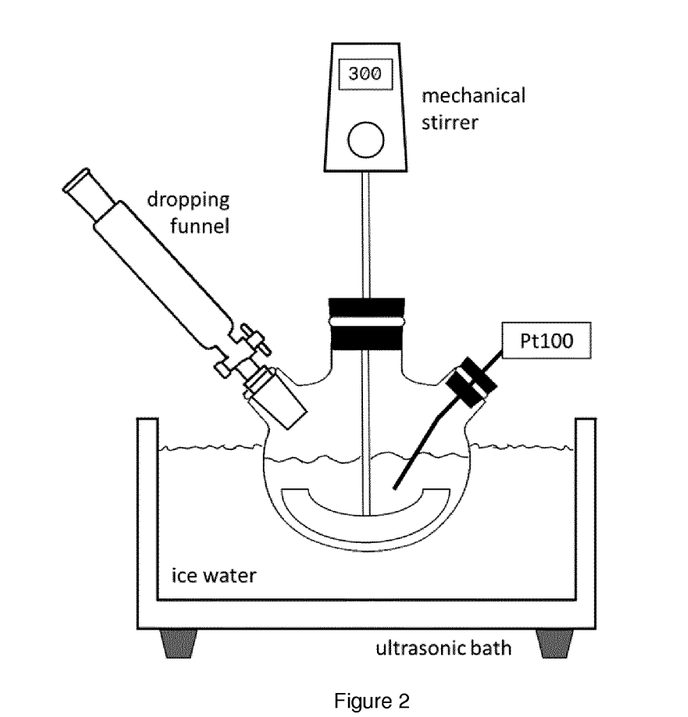
FIG. 2 is a schematic cross sectional view of the experimental setup used for the preparation of the thixotropic compositions described in the Examples.

A schematic cross sectional view of the experimental setup used for the preparation of the Sag Control Dispersions is shown in FIG. 2. The Sag Control Dispersions were prepared in a batch reactor consisting of a one liter round bottomed, glass reactor, a dropping funnel and a mechanical anchor stirrer. A PT100 thermometer is positioned in the liquid in the reactor close to the anchor stirrer. The reactor is placed in an ultrasonic bath (Julabo USR3/2; Ultrasonic frequency is 35 kHz; measured gross power consumption is 70 to 110 W depending on temperature and viscosity of the liquid medium) filled with water and ice cubes. The ultrasonic bath remained switched-on during the complete production process. The energy density E1 is 23-37 W/ltr of liquid being exposed to the ultrasound and the energy density E2 is 130–210 W/ltr of thixotropic composition.

The reactor is filled with a premix of BA (29.67 g) and o-Xylene (250 g) and the dropping funnel is filled with a mixture of Hexamethylene diisocyanate (23.26 g) and o-Xylene (190 g). The stirrer is set at about 300 rpm and the content of the reactor is allowed to cool to a temperature of circa 10° C. or lower by the ice water containing cooling bath. Subsequently, the HMDI/xylene mixture is added from the dropping funnel to the reactor in 10 minutes. Finally, the dropping funnel is rinsed with o-xylene (35 g) resulting in a final HMDI-BA content of 10 wt %. The reaction mixture remains being stirred for a period of 30 minutes after completion of the HMDI dosing procedure (post treatment) during which the ultrasonic bath remained switched on. If needed, the Sag Control Dispersion mixture is homogenized manually at regular time intervals (each 5 minutes) during this post treatment with the help of a small metal rod when the stirring was not effective. After the 30 minutes of post treatment the Sag Control Dispersion is removed from the reactor.

The Sag Control Dispersion then has a solid-like consistency which does not allow easy characterization of the rheological properties. For this reason, the Sag Control Dispersion is mixed with a saturated polyester polyol resin (Seta) 1715 VX-74 available from Allnex) using a mixing ratio as shown in Table 3. The mixture is homogenized in a Hauschild SpeedMixer (DAC 150.1 FVZ) for 60 s at 3000 rpm. The resulting mixture has a solids content of 60.9 wt % and a HMDI-BA SCA concentration of 1.5 wt % on total solids weight.

TABLE 3

| Sag Control Dispersion | 3.61 g |
|---|---|
| Setal 1715 VX-74 Resin | 32.22 g |
| o-Xylene | 4.10 g |
| % SCA on total weight | 0.90 wt % |
| % NVM | 60.9 wt % |
| % SCA on solids weight | 1.5 wt % |

The above formulation is herein defined and referred to as the standard formulation for the determination of the reduced compliance and Hegman fineness. After the homogenization process, the rheological properties and the Hegman fineness of the SCA-modified resin mixture are measured on this standard formulation. The Hegman fineness was determined using a commercial grind Hegman gauge (Byk 1511, two parallel gauges with a maximum depth of 50 μm). With the polyol resin modified with the Sag Control Dispersion of Example 1, the Hegman fineness was 25 μm.

Figure 3:
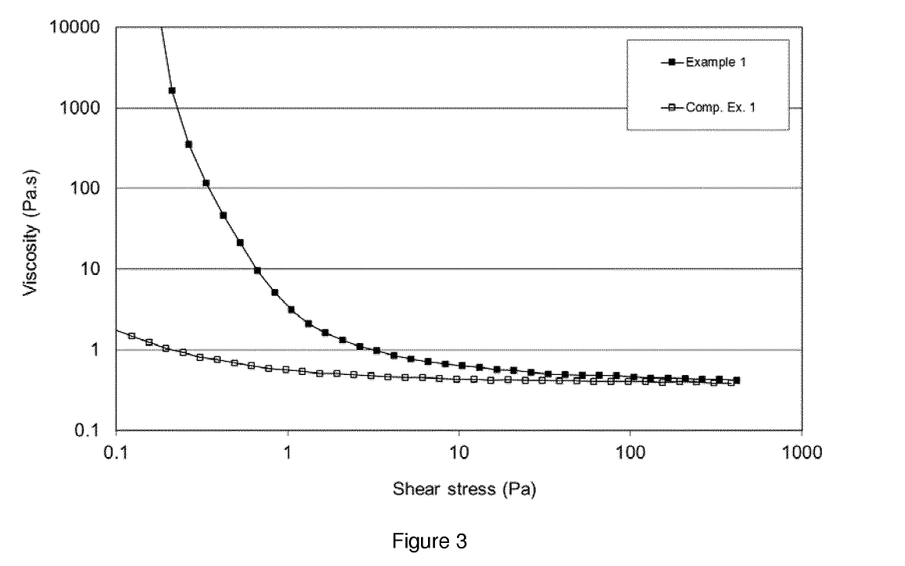
FIG. 3 shows the flow curves (down) for polyol resins modified by the thixotropic composition of Example 1 (filled squares) and Comparative Example 1 (open squares). Both modified resins have a solids content of 60.9% and an HMDI/BA content of 1.5 wt % on total solids weight.

The rheological properties of the SCA-polyol mixture were determined at 23° C. using a cone and plate rheometer (AR2000, TA Instruments) using a 40 mm 4°-cone. A solvent trap was used to prevent unwanted solvent evaporation. The down flow curve (viscosity vs shear rate) was measured from 400 Pa to 0.1 Pa and is shown in FIG. 3. Next to the flow curve, the creep compliance was measured during 5 minutes at a creep stress of 0.7 Pa. The creep test was preceded by a high-shear treatment (30 s at 1000 s$^{-1}$) and a short stop step (2 s at 0 s$^{-1}$). The results are summarized in Table 5.

Comparative Example 1

The Sag Control Dispersion was prepared in the same batch reactor, with the same composition as in Example 1 (Table 2) and using the same procedure as described for Example 1 with the exception that in this case the ultrasonic bath was switched-off during the complete production process (no ultrasonic action). After dosing of HMDI and rinsing the dropping funnel, the reaction mixture was stirred for a period of 30 minutes (without ultrasound). After the 30 minutes post treatment, the solid-like Sag Control Dispersion is removed from the reactor.

The Sag Control Dispersion is mixed with a polyol resin in the composition shown in Table 3 and characterized in the same way as described for Example 1. The Hegman test showed numerous particles over the full gauge (Hegman fineness >50 μm). The down flow curve is shown in FIG. 3 and the results including that of the creep test are summarized in Table 5.

Example 2

Samples of Sag Control Dispersions were made with the composition as shown in Table 4 (10 wt % of HDMI/SAMBA in o-xylene).

TABLE 4

|  | g | mol | o-Xylene (g) |
|---|---|---|---|
| SAMBA | 31.16 | 0.26 | 250 |
| HMDI | 21.62 | 0.13 | 190 |
| o-Xylene rinse | — | — | 35 |

Figure 4:
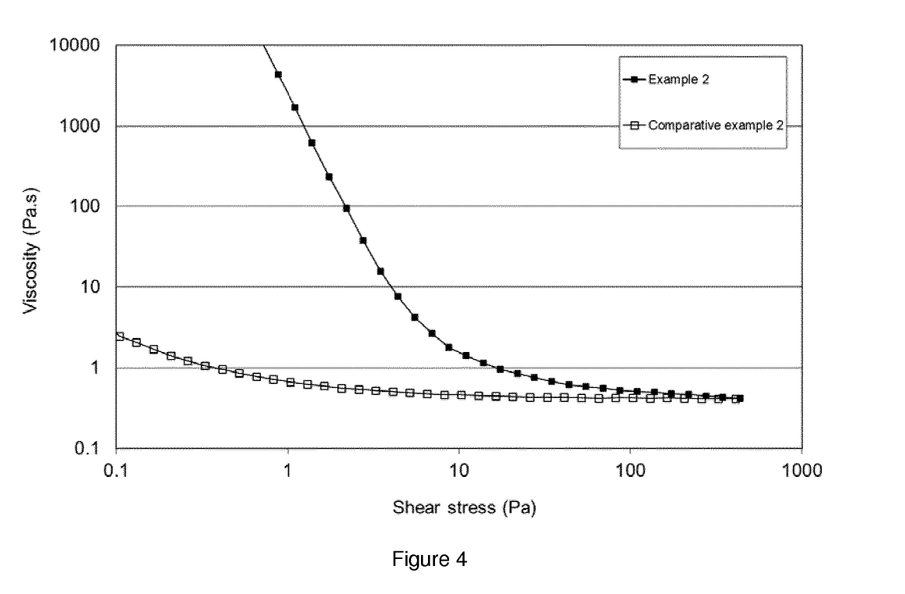
FIG. 4 shows the flow curves (down) for polyol resins modified by the thixotropic composition of Example 2 (filled squares) and Comparative Example 2 (open squares). Both modified resins have a solids content of 60.9 wt % and an HMDI/SAMBA content of 1.5 wt % on total solids weight.

The same experimental setup and process conditions as described for Example 1 were used to manufacture the Sag Control Dispersion of Example 2 under ultrasonic conditions and the thixotropic efficiency and Hegman fineness were measured in the same way. The resulting mixture has a solids content of 60.9 wt % and a HMDI-SAMBA SCA concentration of 1.5 wt % on total solids weight. The Hegman gauge was substantially free of particles over the complete gauge length so the Hegman fineness is circa 0 μm. The down flow curve measured from 400 Pa to 0.1 Pa is shown in FIG. 4. Next to the flow curve, creep compliance values were measured during 5 minutes at creep stress of 0.7 Pa as described above.

Comparative Example 2

The Sag Control Dispersion was prepared as described for Example 2 except that the ultrasonic bath was switched-off during the complete production process. After dosing of HMDI and rinsing the dropping funnel, the reaction mixture was stirred for a period of 30 minutes (without ultrasound). After the 30 minutes post treatment, the solid-like Sag Control Dispersion is removed from the reactor. The Sag Control Dispersion is characterized in the same manner as described above for Example 2. The Hegman test showed numerous particles over the full gauge (Hegman fineness >50 μm). The down flow curve is shown in FIG. 4.

Example 3 to 8

Figure 5:
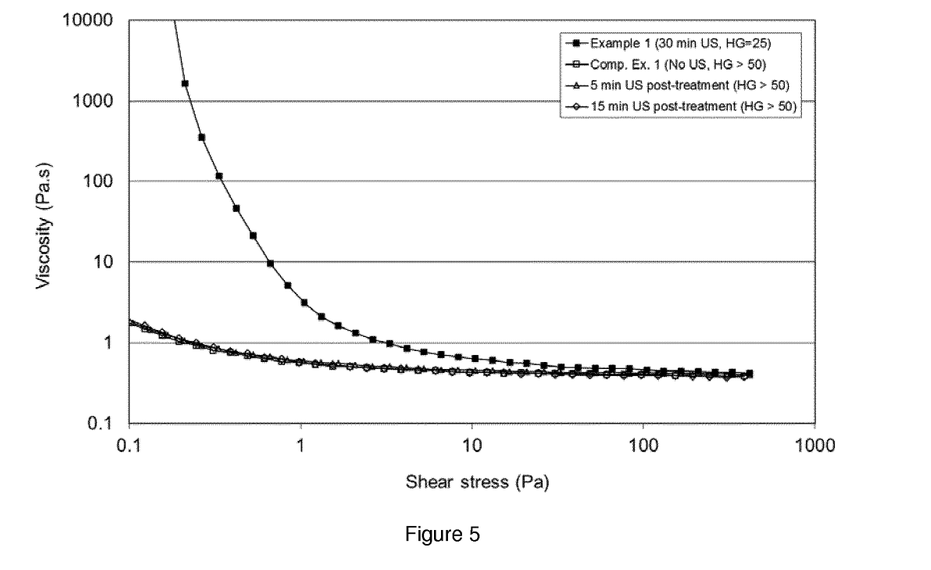
FIG. 5 shows flow curves (down) for polyol resins modified with various HMDI/BA thixotropic compositions of which the duration of the ultrasonic post-treatment was varied. The polyol resin modified by the thixotropic composition of Comparative Example 1 is shown as reference (open squares). The Hegman fineness in µm (HG) of each sample is shown between brackets in the legend. All modified resins have a solids content of 60.9 wt % and an HMDI/BA content of 1.5 wt % on total solids weight.
Figure 6:
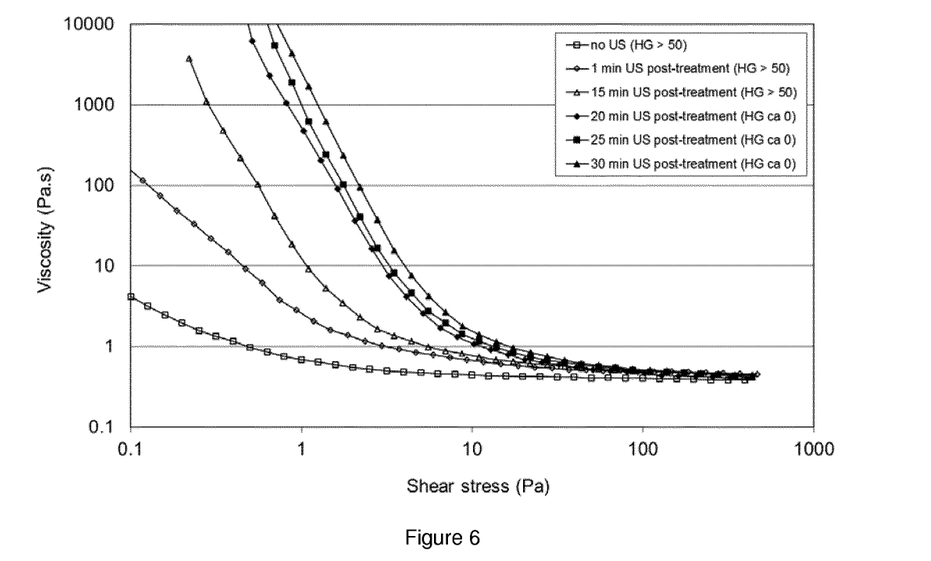
FIG. 6 shows flow curves (down) for polyol resins modified with various HMDI/SAMBA thixotropic compositions of which the duration of the ultrasonic post-treatment was varied. The polyol resin modified by the thixotropic composition of Comparative Example 2 is shown as reference (open squares). The Hegman fineness in µm (HG) of each sample is shown between brackets in the legend. All modified resins have a solids content of 60.9 wt % and an HMDI/SAMBA content of 1.5 wt % on total solids weight.

The impact of the duration of the ultrasonic post-treatment was determined for Sag Control Dispersions with the composition as shown in Table 2 (10 wt % of HDMI/BA in o-xylene; Example 3 and 4) and for Sag Control Dispersions with the composition as shown in Table 4 (10 wt % of HDMI/SAMBA in o-xylene; Example 5 to 8). In all experiments, dosing of the isocyanate was done during 10 minutes with applied ultrasound. After the end of this dosing period, the samples were stirred for a certain time during which the ultrasound remained switched on. The duration of this post-treatment time was varied between the various samples. All prepared Sag Control Dispersion samples were characterized as described above. FIG. 5 and FIG. 6 show an overview of the flow curves (down) of the modified resins as a function of duration of the ultrasound post-treatment for the HMDI/BA samples and the HMDI/SAMBA samples, respectively. In both Figures, resins modified with the Sag Control Dispersion which were made without the use of ultrasound are also shown (Comparative Example 1 in FIG. 5, Comparative Example 2 in FIG. 6).

TABLE 5

|  | E1 | CE1 | Ex2 | CE2 | E3 | E4 | E5 | E6 | E7 | E8 |
|---|---|---|---|---|---|---|---|---|---|---|
| Type SCA | A | A | B | B | A | A | B | B | B | B |
| [SCA] (%) | 1.48 | 1.48 | 1.47 | 1.48 | 1.48 | 1.48 | 1.49 | 1.49 | 1.49 | 1.48 |
| Time US (min) | 10/30 | 0/0 | 10/30 | 0/0 | 10/5 | 10/15 | 10/1 | 10/15 | 10/20 | 10/25 |
| HF (μm) | 25 | >50 | 0 | >50 | >50 | >50 | >50 | >50 | 0 | 0 |
| HSV (Pa · sec) | 0.43 | 0.4 | 0.42 | 0.39 | 0.41 | 0.39 | 0.45 | 0.44 | 0.4 | 0.43 |
| J5' (1/Pa) | 82.9 | 444.8 | 15 | 259 | 454 | 456 | 36.3 | 33.9 | 19.9 | 20.3 |
| Jr (%) | 11.8 | 58.6 | 2.1 | 33.4 | 62.2 | 59.2 | 5.5 | 5 | 2.6 | 2.9 |

A = HMDI/BA,
B = HMDI/SAMBA

Ex 3 and 4 are examples of the process of the invention but the posttreatment was too short to produce a significant improvement for this particular composition A. The examples show that the improvement in thixotropy efficiency is easier for polyurea B then for polyurea A; a mild US treatment (10/15 min) provides significant improvement in thixotropic efficiency for polyurea B (E6), whereas that is not enough for polyurea A (E4). The post-treatment time used for E6 was still too short to result in good Hegman fineness. However, the time needed to produce good Hegman fineness is shorter for polyurea B than for polyurea A (10/20 min in E7 vs 10/30 min in E1).

In Table 5 [SCA] (%) is the weight % of SCA on total solids weight of the mixture. The high-shear viscosity is the (average) viscosity in the down curve in the shear rate range between 850 and 1050 $s^{-1}$, J5' is the creep compliance value after 300 s (5 min: J5'), the reduced compliance is 300*J5' divided by the high-shear viscosity. The creep data are determined at a creep stress of 0.7 Pa.

From Table 5 it can be seen that in these experiments the preferred duration of the ultrasonic post-treatment needed to produce the Sag Control Dispersion material with good fineness as well as good thixotropic efficiency is about 20 minutes for the ultrasonic setup used in these experiments.

The results show that the results for SAMBA based SCA (B) are better in all circumstances than the BA based SCA (A). It can however also be seen that according to the invention an SCA can be prepared from ordinary BA based SCA (E1) that is even better in thixotropic efficiency than the more expensive known SAMBA based SCA (CE2).

It is considered that for different SCA types and in a different set-up and process, the required time of sonic post treatment can be different and can be established in accordance with the above examples for each process condition.

Example 9

Figure 7:
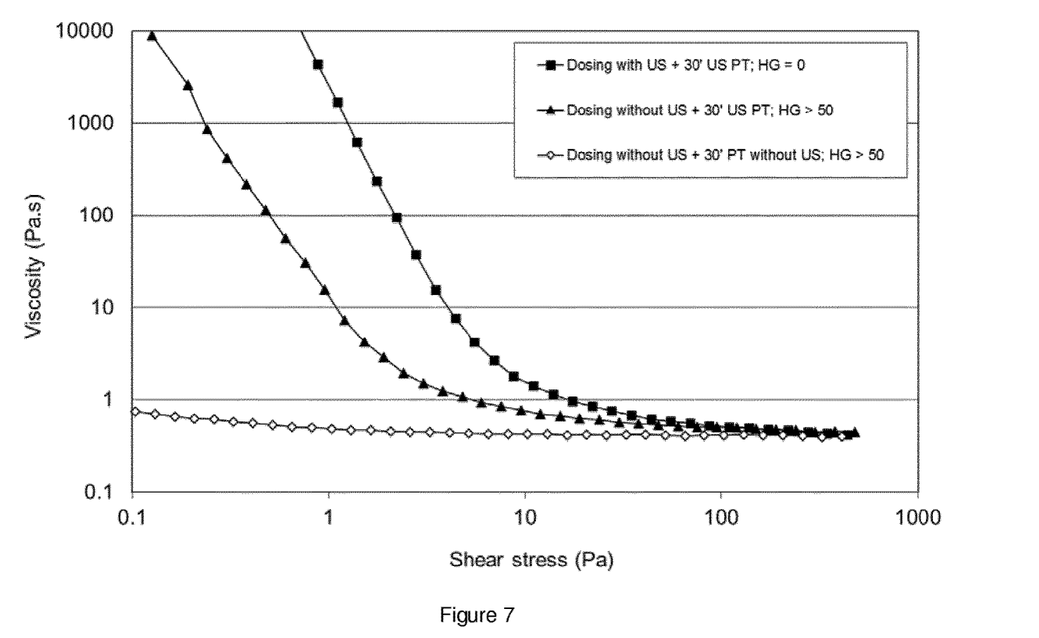
FIG. 7 shows flow curves (down) and Hegman test results (HG) of compositions comprising SCA produced with different ultrasonic treatment in the dosing step (DS) and in the post treatment (PT). The resin modified with the Sag Control Dispersion made without ultrasound is shown as open diamonds (Comparative Example 2), that modified with the Sag Control Dispersion made using ultrasound during both DS and PT is shown as solid squares (Example 2) and that made without ultrasound in the DS but with ultrasound during PT is shown as solid triangles (Example 9). The Hegman test results (HG) of the three samples is shown in the legend. All modified resins have a solids content of 60.9 wt % and an HMDI/SAMBA content of 1.5 wt % on total solids weight.

A Sag Control Dispersions with the composition as shown in Table 4 (10 wt % of HDMI/SAMBA in o-xylene) was prepared in which dosing of the isocyanate was done during 10 minutes without ultrasound followed by a stirring period of 30 minutes during which the ultrasound was switched on. The Sag Control Dispersion sample was characterized as described above. FIG. 7 shows the flow curve (down) of this modified resin (solid triangles). In this Figure, resins modified with the Sag Control Dispersion made without ultrasound (Comparative Example 2, open diamonds) and with the Sag Control Dispersion made with continuous ultrasound (Example 2, solid squares) are also shown. The Hegman test results (HG) of the three samples is shown in the legend. The examples clearly show the surprisingly great improvements in both thixotropy and fineness as a result of applying ultrasound both during and after the reaction.

Example 10 and Comparative Example 3

Example 10 and Comparative example 3 are Sag Control Dispersions with the composition as shown in Table 6 (10 wt % of HDMI/BA, 8 wt % resin solids from Setal 1715 VX-74 and o-xylene) which were prepared using the same method as described above for Example 1 and Comparative Example 1, respectively. In these examples the premix comprising of BA and o-Xylene also contained polyol resin (Setal 1715 VX-74). To allow determination of the reduced compliance and Hegman fineness both Sag Control Dispersions were mixed with additional Setal VX-74 and some o-Xylene to obtain the standard formulation containing 1.5 wt % of SCA on total solids weight and having a solids content of 60.9 wt % (Table 7). The rheological properties and Hegman fineness for these materials are summarized in Table 8.

Comparing the results for E10 and CE3 clearly shows the drastic improvement in Hegman fineness and the improvement in thixotropic efficiency (reduction of reduced compliance) as a result of applying ultrasound both during and after the reaction.

TABLE 6

|  | Gram | mol | o-Xylene (g) |
|---|---|---|---|
| BA | 28.1 | 0.26 | 198 |
| Setal 1715 VX-74 | 54.0 |  |  |
| HMDI | 22.0 | 0.13 | 198 |

TABLE 7

| Sag Control Dispersion | 3.53 g |
| Additional Setal 1715 VX-74 | 31.22 g |
| o-Xylene | 3.64 g |
| % NVM | 60.9 wt % |
| % SCA on solids weight | 1.5 wt % |

TABLE 8

|  | E10 | CE3 |
|---|---|---|
| Type SCA | A | A |
| [SCA] (wt %) | 1.5 | 1.5 |
| Time US (min) | 10/30 | 0/0 |
| HF (μm) | 0 | >50 |
| HSV (Pa · sec) | 0.39 | 0.40 |
| J5' (1/Pa) | 331 | 416 |
| Jr (%) | 43.0 | 55.4 |

Example 11 and Comparative Example 4

Example 11 and Comparative example 4 are Sag Control Dispersions with the composition as shown in Table 9 (10 wt % of HDMI/SAMBA, 40 wt % resin solids from Setal 1715 VX-74 and o-xylene) which were prepared using the same method as described above for Example 1 and Comparative Example 1, respectively. Determination of the reduced compliance and Hegman fineness were done using the mixtures shown in Table 10 (standard resin composition), the results are shown in Table 11. Comparing the results for E11 and CE4 clearly shows the drastic improvement in Hegman fineness as a result of applying ultrasound both during and after the reaction.

TABLE 9

|  | Gram | mol | o-Xylene (g) |
|---|---|---|---|
| SAMBA | 11.9 | 0.1 | 127.8 |
| Setal 1715 VX-74 | 270.3 |  |  |
| HMDI | 8.2 | 0.05 | 82.1 |

TABLE 10

| Sag Control Dispersion | 3.50 g |
| Additional Setal 1715 VX-74 | 10.52 g |
| o-Xylene | 1.10 g |
| % NVM | 60.9 wt % |
| % SCA on solids weight | 1.5 wt % |

TABLE 11

|  | E11 | CE4 |
|---|---|---|
| Type SCA | B | B |
| [SCA] (wt %) | 1.5 | 1.5 |
| Time US (min) | 10/30 | 0/0 |
| HF (μm) | 0 | >50 |

TABLE 11-continued

|  | E11 | CE4 |
|---|---|---|
| HSV (Pa · sec) | 0.46 | 0.43 |
| J5' (1/Pa) | 13.0 | 12.5 |
| Jr (%) | 2.0 | 1.8 |

What is claimed is:

1. A process for the preparation of a thixotropic composition comprising polyurea particles, said process comprising:
   contacting and reacting in a liquid medium, reactants (I) comprising a polyisocyanate (a) and a mono-amine (b), or reactants (II) comprising a polyamine (a) and a mono-isocyanate (b) to form a polyurea, and
   precipitating the polyurea to form polyurea particles, wherein acoustic vibration is applied during contacting of the reactants or as a post-treatment on the formed polyurea particles or both,
wherein the reaction takes place in the liquid medium in substantial absence of a polymeric resin material, and the thixotropic composition comprises at least 4 wt % of the polyurea particles relative to the total weight of the thixotropic composition and substantially no polymeric resin material;
or
wherein the polyurea particles are formed in the presence of the polymeric resin material, and the thixotropic composition comprises between 1 and 40 wt % of the polymeric resin material and at least 4 wt % of the polyurea particles relative to the total weight of the thixotropic composition including the polymeric resin material;
or
wherein the reaction takes place in a resin composition comprising between 40 wt % and 85 wt % of the polymeric resin material as a binder, and the thixotropic composition comprises between 0.1 and 8 wt % of the polyurea particles, wherein the wt % are relative to the total weight of the thixotropic composition.

2. The process according to claim 1, wherein acoustic vibration is applied both during the contacting of the reactants and, as a post-treatment, on the formed polyurea particles.

3. The process according to claim 1, wherein temperature during the contacting and/or in the post-treatment is lower than 80° C.

4. The process according to claim 1, wherein the acoustic vibration is sonic vibration applied either indirectly or directly.

5. The process according to claim 1, wherein the acoustic vibration has an energy density E1 of more than 5 W/l, where the energy density is the gross power of the ultrasonic unit(s) divided by the total volume of liquid being exposed to the ultrasound, or
   wherein the acoustic vibration has an energy density E2 of more than 5 W/l, where the energy density is the gross power of the ultrasonic unit(s) divided by the total volume of thixotropic composition being exposed to the ultrasound.

6. The process according to claim 1, wherein the reactants and the formed polyurea particles are also subjected to stirring.

7. The process according to claim 1, wherein the reaction takes place in the liquid medium in substantial absence of the polymeric resin material, and the thixotropic composition comprises at least 6 wt %, and less than 40 wt % of the polyurea particles relative to the total weight of the thixotropic composition and substantially no polymeric resin material.

8. The process according to claim 1, wherein the polyurea particles are formed in the presence of the polymeric resin material, and the thixotropic composition comprises between 1 and 25 wt % of the polymeric resin material and at least 4 wt % of the polyurea particles relative to the total weight of the thixotropic composition including polymeric resin material.

9. The process according to claim 1, wherein the reaction takes place in the resin composition comprising between 40 wt % and 85 wt % of the polymeric resin material as the binder, and the thixotropic composition comprises between 0.1 and 5 wt % of the polyurea particles, wherein the wt % are relative to the total weight of the thixotropic composition.

10. The process according to claim 1, wherein acoustic vibration is applied only as a post treatment to the thixotropic composition or to a coating composition comprising polyurea particles.

11. A thixotropic composition obtained by the process of claim 1.

12. The thixotropic composition of claim 11 comprising A) at least 5 wt % of polyurea particles and comprising substantially no polymeric resin, or B) comprising at least 5 wt % of polyurea particles and between 1 and 40 wt % of polymeric resin, wherein the wt % is relative to the total weight of the thixotropic composition, and wherein the thixotropic composition, when tested at a concentration of 1.5 wt % polyurea particles based on total solids weight, has a reduced compliance lower than 50% and a Hegman fineness value of less than 40 μm.

13. The thixotropic composition of claim 11, wherein at least part of the polyurea particles is prepared from a di-isocyanate and benzylamine or wherein at least part of the polyurea particles is prepared from chiral amines or chiral isocyanates.

14. The thixotropic composition of claim 11 comprising a liquid medium selected from the group consisting of a solvent, a reactive diluent, a low molecular weight resin, and combinations thereof.

15. A method for the preparation of a coating-, gel coat-, paint-, adhesive-, ink- or sealant composition comprising the step of adding the thixotropic composition of claim 11 to the coating-, gel coat-, paint-, adhesive-, ink- or sealant composition.

16. A coating composition prepared from the thixotropic composition according to claim 11.

17. A cured coating prepared from the coating composition of claim 16.

18. The process of claim 1, wherein the liquid medium is selected from the group consisting of a solvent, a reactive diluent, a low molecular weight resin and combinations thereof.

19. A coating composition comprising polyurea particles from the thixotropic composition according to claim 11.

20. A cured coating prepared from the coating composition of claim 19.

21. The thixotropic composition of claim 11 comprising:
   A) at least 5 wt % of polyurea particles and comprising substantially no polymeric resin, wherein at least part of the polyurea particles is prepared from reactants (I) comprising the polyisocyanate (a) and the mono-amine (b), or reactants (II) comprising the polyamine (a) and the mono-isocyanate (b), wherein the mono-amine (b) or mono-isocyanate (b) are chiral.

22. The thixotropic composition of claim 21, wherein at least part of the polyurea particles is prepared from reactants (I), and wherein the polyisocyanate (a) is hexamethylene diisocyanate and the chiral mono-amine (b) is alpha-methylbenzylamine.

23. The thixotropic composition of claim 22, wherein first polyurea particles are prepared and are a reaction product of the polyisocyanate (a), which is hexamethylene diisocyanate and the chiral mono-amine (b), which is alpha-methylbenzylamine, and second polyurea particles are formed and precipitated in the presence of the first polyurea particles, wherein the second polyurea particles are a reaction product of the polyisocyanate (a), which is hexamethylene diisocyanate and the mono-amine (b) which is benzylamine.

24. The thixotropic composition of claim 11 comprising:
B) at least 5 wt % of polyurea particles and between 1 and 40 wt % of polymeric resin, wherein the wt % are relative to the total weight of the thixotropic composition, and wherein the polyurea particles are prepared from reactants (I) comprising the polyisocyanate (a) and a non-chiral mono-amine (b) or reactants (II) comprising the polyamine (a) and a non-chiral mono-isocyanate (b).

25. The thixotropic composition of claim 24, wherein the polyisocyanate (a) is hexamethylene diisocyanate and the non-chiral mono-amine (b) is benzylamine.

26. The process according to claim 4, wherein the acoustic vibration is ultrasonic vibration.

27. The process according to claim 7, wherein the thixotropic composition comprises at least 8 wt % of polyurea particles.

28. The process according to claim 7, wherein the thixotropic composition comprises at least 10 wt % of polyurea particles.

29. The process according to claim 7, wherein the thixotropic composition comprises at least 15 wt % of polyurea particles.

30. The process according to claim 7, wherein the thixotropic composition comprises less than 25 wt % of polyurea particles.

31. The process according to claim 8, wherein the thixotropic composition comprises between 1 and 15 wt % of polymeric resin material.

32. The process according to claim 8, wherein the thixotropic composition comprises between 1 and 10 wt % of polymeric resin material.

33. The process according to claim 8, wherein the thixotropic composition comprises at least 8 wt % of polyurea particles.

34. The process according to claim 8, wherein the thixotropic composition comprises at least 10 wt % of polyurea particles.

35. The thixotropic composition of claim 12 comprising A) at least 8 wt % of polyurea particles and comprising no polymeric resin.

36. The thixotropic composition of claim 12 comprising A) at least 10 wt % of polyurea particles and comprising no polymeric resin.

37. The thixotropic composition of claim 12 comprising B) at least 8 wt % of polyurea particles and between 1 and 40 wt % of polymeric resin.

38. The thixotropic composition of claim 12 comprising B) at least 8 wt % of polyurea particles and between 1 and 15 wt % of polymeric resin.

39. The thixotropic composition of claim 14, wherein the low molecular weight resin is a UV curable resin or an epoxy resin.

40. The thixotropic composition of claim 14 comprising a polymer resin dissolved or dispersed in the liquid medium.

41. The method of claim 15, wherein the thixotropic composition is a masterbatch.

42. The thixotropic composition of claim 18, wherein the low molecular weight resin is a UV curable resin or an epoxy resin.

43. The thixotropic composition of claim 18 comprising a polymer resin dissolved or dispersed in the liquid medium.

* * * * *